(12) United States Patent
Rickman et al.

(10) Patent No.: US 11,089,392 B2
(45) Date of Patent: Aug. 10, 2021

(54) OPTOELECTRONIC SWITCH

(71) Applicant: ROCKLEY PHOTONICS LIMITED, London (GB)

(72) Inventors: Andrew Rickman, Marlborough (GB); Cyriel Johan Agnes Minkenberg, Neuheim (CH); Guy Regev, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 0 days.

(21) Appl. No.: 16/487,782

(22) PCT Filed: Feb. 21, 2018

(86) PCT No.: PCT/EP2018/054312
§ 371 (c)(1),
(2) Date: Aug. 21, 2019

(87) PCT Pub. No.: WO2018/153939
PCT Pub. Date: Aug. 30, 2018

(65) Prior Publication Data
US 2020/0314511 A1    Oct. 1, 2020

Related U.S. Application Data

(60) Provisional application No. 62/462,240, filed on Feb. 22, 2017.

(30) Foreign Application Priority Data

May 25, 2017 (GB) ...................................... 1708402

(51) Int. Cl.
*H04Q 11/00* (2006.01)

(52) U.S. Cl.
CPC ..... *H04Q 11/0071* (2013.01); *H04Q 11/0005* (2013.01); *H04Q 11/0066* (2013.01);
(Continued)

(58) Field of Classification Search
CPC .......... H04Q 11/0071; H04Q 11/0005; H04Q 11/0066; H04Q 11/0061; H04Q 2011/0016; H04Q 2011/0058; H04Q 2011/0096
(Continued)

(56) References Cited

U.S. PATENT DOCUMENTS

2005/0180068 A1* 8/2005 Lopata .................... G06F 1/263
361/18
2010/0254652 A1* 10/2010 Kirkpatrick ........ H04Q 11/0005
385/17

(Continued)

FOREIGN PATENT DOCUMENTS

WO   WO 2016/170357 A1   10/2016
WO   WO 2017/077093 A2   5/2017

OTHER PUBLICATIONS

International Search Report and Written Opinion of corresponding PCT/EP2018/054312, dated Jul. 30, 2018, 19 pages.
(Continued)

*Primary Examiner* — Ted M Wang
(74) *Attorney, Agent, or Firm* — Lewis Roca Rothgerber Christie LLP

(57) ABSTRACT

An optoelectronic switch for switching data from a source external client device to a destination external client device, the optoelectronic switch includes: an array of client-side transceivers, each having an array of client-facing optical ports to connect to an external client device, and an array of leaf-facing electrical ports; an array of leaf switches, each including an array of client-side electrical ports and an array (Continued)

of fabric-side electrical ports; a first electrical interconnecting region providing electrical connections between the leaf-facing electrical ports of the client-side transceivers and the client-side electrical ports of the leaf switches, an array of fabric-side transceivers, each having an array of leaf-facing electrical ports, and an array of fabric-facing optical ports; a second electrical interconnecting region providing electrical connections between the fabric-side electrical ports of the leaf switches and the leaf-facing electrical ports of the fabric-side transceivers; an array of spine switches, each including an array of fabric-facing optical ports; and an optical fabric providing connections between the fabric-facing optical ports of the fabric-side transceivers and the fabric-facing optical ports of the spine switches.

18 Claims, 8 Drawing Sheets

(52) U.S. Cl.
CPC ............... *H04Q 2011/0016* (2013.01); *H04Q 2011/0058* (2013.01); *H04Q 2011/0096* (2013.01)

(58) Field of Classification Search
USPC .......................................................... 398/45
See application file for complete search history.

(56) References Cited

U.S. PATENT DOCUMENTS

| 2010/0254703 | A1 | 10/2010 | Kirkpatrick et al. |
| 2015/0230007 | A1 | 8/2015 | Hessong et al. |
| 2016/0366498 | A1* | 12/2016 | Robinson ............. G02B 6/3542 |
| 2017/0041691 | A1 | 2/2017 | Rickman et al. |

OTHER PUBLICATIONS

Invitation to Pay Additional Fees and Partial International Search Report of corresponding PCT/EP2018/054312, dated Jun. 6, 2018, 14 pages.
Stephens, Ransom, "Optimize equalization for FFE, CTLE, DFE and crosstalk", EDN, Oct. 21, 2015, 7 pages, www.edn.com/optimize-equalization-for-ffe-ctle-dfe-and-crosstalk/.
U.K. Intellectual Property Office Search and Examination Report, dated Jul. 14, 2017, for Patent Application No. GB1708402.1, 7 pages.
U.S. Appl. No. 16/491,561, filed Sep. 5, 2019, not yet published.
Ahn, Jung Ho et al., "HyperX: Topology, Routing, and Packaging of Efficient Large-Scale Networks," SC09 Nov. 14-20, 2009, Portland, Oregon, USA, Copyright 2009 ACM 978-1-60558744-8/09/11, 11 pages.
Al-Fares, Mohammad et al., "A Scalable, Commodity Data Center Network Architecture," Department of Computer Science and Engineering, University of California, San Diego, La Jolla, CA, SIGCOMM '08, Aug. 17-22, 2008, Seattle, Washington, USA, Copyright 2008 ACM 978-1-60558-175-0/08/08, 12 pages.
Besta, Maciej, et al. "Slim Fly: A Cost Effective Low-Diameter Network Topology," SC14: International Conference for High Performance Computing, Networking, Storage and Analysis, IEEE Computer Society, © 2014, 978-1-4799-5500-8/14, pp. 348-359.
Bhuyan, Laxmi N., et al. "Generalized Hypercube and Hyberbus Structures for a Computer Network," IEEE Transactions on Computers, vol. C-33, No. 4, Apr. 1984, pp. 323-333.
Chen, Dong et al., "An Evaluation of Network Architectures for Next Generation Supercomputers," 2016 7th International Workshop on Performance Modeling, Benchmarking and Simulation of High Performance Computer Systems, 978-1-5090-5218-9/16, © 2016 IEEE, pp. 11-21.
De Dobbelaere, P. et al., "Silicon-photonics-based optical transceivers for high-speed interconnect applications," Next-Generation Optical Networks for Data Centers and Short-Reach Links III, edited by Atul K. Srivastava, Proc. of SPIE vol. 9775, 977503, © 2016 SPIE 5 pages.
Farrington, Nathan et al. Helios: A Hybrid Electrical/Optical Switch Architecture for Modular Data Centers, SIGCOMM'10, Aug. 30-Sep. 3, 2010, New Delhi, India, Copyright 2010, ACM 978-1-4503-0201-2/10/08, 12 pages.
Feng, Dazeng et al., "Micron-scale Silicon Photonic Devices and Circuits," © 2014 Optical Society of America, Mellanox Technologies, Inc. Monterey Park, CA 91754, USA, 3 pages.
Hasharoni, Kobi et al., "A High End Routing Platform for Core and Edge Applications Based on Chip to Chip Optical Interconnect," Compass Electro-Optical Systems, Netanya, Israel, OFC/NFOEC Technical Digest © 2013 OSA, 3 pages.
Kathareios, Georgios, et al., "Cost-Effective Diameter-Two Topologies: Analysis and Evaluation," SC '15, Nov. 15-20, 2015, Austin, TX, USA, ACM 978-1-4503-3723-6/6/15/11, 11 pages.
Mysore, Radhika Niranjan, et al. "PortLand: A Scalable Fault-Tolerant Layer 2 Data Center Network Fabric," SIGCOMM'09, Aug. 17-21, 2009, Barcelona, Spain, Copyright 2009 ACM 978-1-60558-594-09/09/08, pp. 39-50.
Orcutt, Jason S., Design of Monolithic Silicon Photonics at 25 Gb/s, IBM Research, New York, 978-1-5090-6069-6/17 © 2017 IEEE, 4 pages.
Ramaswamy, A. et al., A WDM 4x28Gbps Integrated Silicon Photonic Transmitter driven by 32nm CMOS driver ICs, OFC Postdeadline Papers © OSA 2015, 3 pages.
Specification for QSFP+ 28 Gb/s 4X Pluggable Transceiver Solution (QSFP28), Rev 1.9, Jun. 29, 2015, Developed by the SFF Committee prior to it becoming the SFF TA (Technology Affiliate) TWG (Technical Working Group) of SNIA (Storage Networking Industry Association), 14 pages.
Sun, Chen et al., "Single-chip microprocessor that communicates directly using light," Nature, vol. 528, Dec. 31, 2015, © 2015 Macmillan Publishers Limited, 11 pages.
Valerio, M, et al., Using Fat-Trees to Maximize the Number of Processors in a Massively Parallel Computer, Department of Electrical and Computer Engineering, University of California, Santa Barbara, 7 pages.
Wang, Guohui et al., c-Through: Part-time Optics in Data Centers, SIGCOMM'10, Aug. 30-Sep. 3, 2010, New Delhi, India Copyright 2010 ACM 978-1-4503-0201-2/10/08, pp. 327-338.
Yao, Zhiping et al., "Introducing Backpack: Our second-generation modular open switch," Posted on Nov. 8, 2016 to Data Center Engineering, Networking & Traffic, 6 pages.
Zhang, Bo et al., A 28 Gb/s Multistandard Serial Link Tranceiver for Backplane Applications in 28 nm CMOS, IEEE Journal of Solid-State Circuits, vol. 50, No. 12, Dec. 2015, 12 pages.
Zhang, Chong et al., "8x8x40 Gbps fully integrated silicon photonic network on chip," Optica, vol. 3, No. 7, Jul. 2016, pp. 785-786.

* cited by examiner (a)

(b)

OPTOELECTRONIC SWITCH

CROSS-REFERENCE TO RELATED APPLICATION(S)

This application is a national stage entry, under 35 U.S.C. § 371, of International Application Number PCT/EP2018/054312, filed on Feb. 21, 2018, which claims priority to and the benefit (i) of U.S. Provisional Patent Application No. 62/462,240, filed Feb. 22, 2017, and (ii) British Patent Application Number 1708402.1, filed May 25, 2017. The entire contents of all of the applications identified in this paragraph are incorporated herein by reference.

TECHNICAL FIELD OF THE INVENTION

The present invention relates to optoelectronic switches, and various components contained therein.

BACKGROUND TO THE INVENTION

Currently, chassis switches are typically built using full-featured, high-capacity electronic packet switch (EPS) ASICs as the "building blocks" of the switch. Most often, the chassis switch includes an array of these switches arranged in a folded Clos network. Constructing switches in this manner requires many electrical redriver chips in between the EPS chips and complex high-speed electrical backplanes and connectors. This is because, in these examples, the electrical IOs in the switch ASICs may not be able to meet the link power budget requirements to drive the signal across a certain distance of electrical PCB trace and/or connectors(s) to another backplane or PCB within a target signal-to-noise margin.

This is illustrated in FIG. 1, which shows a prior art chassis switch 1 employing a fully electrical backplane 2. It is useful to divide the arrangement into a number of different "tiers" or "bands", each represented by one of the horizontal rows of components, each represented by the rectangles. These tiers include a tier T1' of transceivers X1' to X16', a first tier T2' of redriver chips R', a tier T3' of EPSs referred to as leaf switches L1' to L8', a second tier T4' of redriver chips, a third tier T5' of redriver chips R' and a tier T6' of EPS referred to as spine switches S1 to S4. Each of the transceivers X1' to X16' is connected to an external client device (not shown). Alternatively, there may be only one tier of redriver chips, but the redriver chips may be located on either side of the fabric.

Each leaf switch L1' to L8' has sixteen client-facing ports, and sixteen fabric-facing ports. Throughout this application, the term "fabric" refers to the network of interconnecting paths, e.g. cables or fibres, which provide connectivity between the leaf switches (in FIG. 1: L1' to L8') and the spine switches (in FIG. 1: S1' to S8'). In the configuration shown in FIG. 1, the fabric is in the form of a high-speed electrical backplane, which (as the name suggests) includes conductive paths such as wires or electrical traces for transmitting electrical signals between the leaf switches L1' to L8' and the spine switches S1' to S8' via the redriver chips in tiers T4' and T5'.

Herein, "client-facing" refers to the set of ports which are on the same "side" as the transceivers X1' to X16', i.e. the same side as the external client devices. "Fabric-facing" refers to the opposite "side" of the leaf switch L1' to L8', i.e. the side which faces tiers T4' and T5', the "fabric".

Each of the client-facing ports and each of the fabric-facing ports on the leaf switches L1' to L8' is connected to a redriver chip. Specifically, the fabric-facing ports are connected to redriver chips R' in tier T4', and the client-facing ports are connected to redriver chips R' in tier T2'.

The spine switches S1' to S4' have no client-facing ports, since they are not connected to external devices. Rather, they each have thirty-two fabric-facing ports, each connected to a redriver chip R' in tier T5'. The chassis switch shown in FIG. 1 is configured to transmit an optical signal from a source external client device to a destination external device. The operation of the chassis switch 1 shown in FIG. 1 will now be described, by considering an example in which an optical signal is transferred from an external client device connected to transceiver X1' on leaf switch L1' to an external client device connected to transceiver X16' on leaf switch L8'.

Broadly speaking, the optical signal travels through the tiers in the order: T1'→T2'→T3'→T4'→T5'→T6'→T5'→T4'→T3'→T2'→T1' (though in some cases, where the source and destination external client modules are connected to the same leaf switch, there is no need for the signal to traverse all of the tiers, and it may travel only from T1'→T2'→T3'→T2'→T1'. During the signal transfer, the redriver chips can be disregarded, since they are effectively just an extension of the client- or fabric-facing ports, and have no routing function, having only a single input and a single output. The switching functionality of the optoelectronic switches is effected by the leaf switches L1' to L8' and the spine switches S1' to S4'.

An optical signal arrives at a transceiver X1' from the source external client device, whereupon it is converted into an electrical signal carrying the same data. The optical signal now enters the leaf switch L1' at the leftmost client port. Then, depending on the intended destination of that signal, the electrical signal is switched by the EPS to e.g. the rightmost fabric-facing port on leaf switch L1'. As is shown, each fabric-facing port on the leaf switches L1' to L8' is connected to a fabric-facing port on one of the spine switches S1' to S4'. In the specific example shown in FIG. 1, each spine switch S1' to S4' has four connections to each leaf switch L1' to L8'. The selection of the appropriate output on the leaf switch L1' is controlled by electronics included on the leaf switch L1'. As is shown, the rightmost fabric-facing port on the leftmost leaf switch L1' is connected to fabric-facing port of spine switch S4', From here, the signal is switched by the spine switch S4' (again controlled by electronics on the spine switch S4'), to another of the fabric-facing ports, which is connected to a fabric-facing port on L8', then the signal is transmitted to that fabric-facing port. From here, bearing in mind that the intended destination of the signal is an external client device which is connected to transceiver X16', the leaf switch L8' switches the signal to the rightmost client-facing port. Then, it is transmitted to transceiver X16', whereupon it is converted back into an optical signal, and subsequently transmitted to its destination external client device.

As is evident from the above description, and from FIG. 1 itself, all of the switching and transmission takes place in the electrical domain. So, there is a requirement for a high-speed electrical backplane as shown, High-speed electrical line cards and/or backplanes such as this are expensive and complex to manufacture. Both are types of PCB. By "high-speed", it should be understood that data signals which are clocked at high frequencies (e.g. around 25 GHz for a 25G link) are routed through these PCBs. These require many PCB layers to route all of the traces away from the chip, hence the expense and complexity of manufacture. Furthermore, when transmitting electronic signals across the backplane, it is necessary to include the redriver chips, as shown. This also incurs additional cost, power and space. The EPS which are used for the leaf switches L1 to L8' and the spine switches S1' to S4' must have a large radix in order to support switching on the required scale, i.e. 32 fabric-facing ports. These full-featured high-capacity EPSs are complex and expensive. It is therefore desirable to provide an optoelectronic switch which offers both reduced complexity to manufacture, and cost.

SUMMARY OF THE INVENTION

At its most general, the present invention provides an optoelectronic switch for switching an optical signal from a source external client device to a destination external client device, in a manner which substantially reduces the number of large complex EPSs and redriver chips. The present invention also provides an optoelectronic switch with a significantly reduced power consumption than what is already known, allowing for power savings in e.g. datacentres. This improvement is made possible by the provision of small-scale switching elements having integrated optical inputs and outputs. The switching elements also negate the need for a complicated electronic backplane. Specifically, a first aspect of the invention provides an optoelectronic switch for switching data from a source external client device to a destination external client device, the optoelectronic switch including:

an array of client-side transceivers, each having an array of client-facing optical ports to connect to an external client device, and an array of leaf-facing electrical ports;

an array of leaf switches, each including an array of client-side electrical ports and an array of fabric-side electrical ports;

a first electrical interconnecting region providing electrical connections between the leaf-facing electrical ports of the client-side transceivers and the client-side electrical ports of the leaf switches, an array of fabric-side transceivers, each having an array of leaf-facing electrical ports, and an array of fabric-facing optical ports;

a second electrical interconnecting region providing electrical connections between the fabric-side electrical ports of the leaf switches and the leaf-facing electrical ports of the fabric-side transceivers;

an array of spine switches, each including an array of fabric-facing optical ports; and an optical fabric providing connections between the fabric-facing optical ports of the fabric-side transceivers and the fabric-facing optical ports of the spine switches.

As will be evident from the components set out above, switches according to the first aspect of the present invention do not require redriver chips or a complex electrical backplane. This is because, when using optical inputs and outputs, the data signals can be routed directly through fibres, and the PCB needs only low-speed and power (i.e. ground, $V_{dd}$) electrical connections. The transceivers of the present invention in effect replace the redriver chips, in that the signal is driven electronically over a small distance (a few centimetres, perhaps) to the transceiver, which can then connect across a longer distance (e.g. up to a few kilometres) to another transceiver, on another PCB, or possibly to an external client device. Instead, in contrast to the arrangement shown in FIG. 1 (described in detail in the Background section above), the interconnection between the leaf switches and spine switches is in the form of an optical fabric.

By utilizing the optical, rather than electrical, domain for the transmission of signals across an interconnecting fabric, it is possible to transmit data at higher rates and over longer distances. The power loss associated with optical transmission of data is lower than that associated with electrical transmission. It is this feature of the optoelectronic switch which removes the need for redriver chips distributed throughout the switch fabric. Put another way, the optical fabric preferably provides direct connections between the fabric-facing optical ports of the fabric-side transceivers and the fabric-facing optical ports of the spine switches, where "direct" means that there are no additional components (e.g. redriver chips, as required by the switch of FIG. 1) located between the two optical ports in a given connection. Alternatively, it may be said that the array of leaf switches is connected to the array of spine switches only via the second electrical interconnecting region, the fabric-side transceivers and the optical fabric.

A further advantage of the use of an optical fabric is bit-rate independence, wherein switch plane data operates at packet rate, rather than bit rate. Use of an optical fabric also opens up the possibility of wavelength-division multiplexing, which is discussed in more detail later in the application, in relation to the operation of the optoelectronic switch.

Optoelectronic switches according to the present invention may be referred to as chassis switches. A chassis switch may be in the form of a packet switch including multiple switch ASICs within a multiple RU (rack unit) rack enclosure. Furthermore, in preferred embodiments, the optoelectronic switch of the present invention is arranged to switch packets of data, and may therefore be referred to as an optoelectronic packet switch. This is not to be confused with the optoelectronic nature of the spine switches, which themselves may be considered optoelectronic packet switches.

Broadly speaking, the optoelectronic switch of the first aspect of the present invention is divided into the "client-side" and the "fabric-side", the leaf switches being at the interface between these two sides. The client-side is the side which includes optical ports for connecting to external client devices. Specifically, these ports are the client-facing optical ports of the client-side transceivers. These ports are preferably located on the outside of the optoelectronic switch, so that they may be easily accessed when connecting the external client device. Conversely, the fabric-side is the side which includes the fabric-side transceivers, the optical fabric and the spine switches. These internal components are located inside the switch, and do not connect with external client devices.

It should also be noted that throughout the present application, the "ports" are bidirectional, in that they preferably include an input portion for reception of a signal in one direction, and an output portion for transmission of a signal in the opposite direction. So, when we refer to a port "transmitting", "sending" a signal, or something equivalent, this is performed by, or occurs via an output portion of that port. Similarly, when we refer to a port "receiving" a signal, a signal "being incident upon/at" a port, or something equivalent, this is performed by, or occurs via an input portion of that port. In some embodiments, the input and output portions may be embodied in the same physical components, but in other embodiments, they may be separate physical components. In other words any or all of the client-facing optical ports, leaf-facing electrical ports, client-side electrical ports, fabric-side electrical ports, and/or fabric-facing optical ports may be bidirectional ports.

Along the same vein, the "connections" referred to, be they optical or electrical, are also bidirectional. This may mean that they are in the form of single conductive traces/wires, or optical fibres, which are able to convey signals in both directions. However, in preferred embodiments, this is achieved by using a pair of wires/fibres/traces. In other words, any or all of the connections present in the first electrical interconnecting region, the second electrical interconnecting region and/or the optical interconnecting region may be bidirectional connections.

The nature of the connectivity provided by the optical fabric, depends on the association between the leaf switches and the fabric-side transceivers. Each leaf switch may be connected to one or more fabric-side transceivers, preferably a plurality of transceivers (referred to herein as a "set" of fabric-side transceivers). To provide improved topological regularity, each of the leaf switches in the array of leaf switches may be connected to the same number of fabric-side transceivers, i.e. the set of fabric-side transceivers connected to each respective leaf switch may include the same number of fabric-side transceivers. For further improved topological regularity, each of the fabric-side transceivers to which a given leaf switch is connected may be identical or substantially identical. Specifically, each of the fabric-side transceivers in the set connected to a given leaf switch may include the same number of fabric-facing optical ports. Additionally, each of the fabric-side transceivers connected to a given leaf switch may include the same number of leaf-facing electrical ports.

In order to provide full connectivity between the fabric-facing optical ports of the fabric-side transceivers and of the spine switches, it is preferred that for a given leaf switch the total number of fabric-facing optical ports on the set of fabric-side transceivers connected to that leaf switch is equal to or greater than the number of spine switches in the array of spine switches, and that the total number of fabric-facing optical ports on the spine switches is greater than or equal to the number of leaf switches in the array of leaf switches. Then, on a given leaf switch, there may be at least one connection provided to each of the spine switches (via a fabric-side transceiver) and on a given spine switch, there may be at least one connection provided to each of the leaf switches (via a fabric-side transceiver). In other words, for a given leaf switch, there is a connection provided between each of the spine switches, via a fabric-side transceiver connected to that leaf switch, and a respective fabric-facing optical port on that spine switch (these connections may be referred to herein as "first" or "initial" connections).

Of course, it is preferred that this is true of all spine switches in the array. Here "respective" should be understood to mean that the leaf switches are connected to different fabric-facing optical ports on the spine switch in question, or that each of the connections originates/terminates in a different fabric-facing optical port. In some embodiments, each leaf switch may include additional connections (still via the fabric-side transceivers) to one or all of the spine switches, the additional connections being to different fabric-facing optical ports on the spine switch(es) in question from the initial connections described above. In preferred embodiments, however, there is a one-to-one connection (via the fabric-side transceivers) between the leaf switches and the fabric-facing optical ports on a given spine switch. In other words, for a given spine switch, there is a one-to-one relationship between the fabric-facing optical ports on that spine switch and the respective leaf switches to which they are connected.

Thus, data which arrives at a given leaf switch from an external client device (via one of the client-side transceivers) may be switched using any one of the spine switches. The availability of all of the spine switches for the switching of a signal greatly reduces the risk of bottlenecks occurring, thereby increasing the extent to which the optoelectronic switch may perform non-blocking operation.

For example, if there are sixty-four spine switches and eight leaf switches in the optoelectronic switch, then each leaf switch in the array may be connected to four fabric-side transceivers, each having sixteen fabric-facing optical ports. Similarly, on a given spine switch, there are eight fabric-facing optical ports, each connected to a fabric-side transceiver which is associated with a different one of the eight leaf switches. In this way, the optical fabric is able to include at least one connection (e.g. an optical fibre or waveguide) between that leaf switch and each one of the spine switches. This particular arrangement is described in greater detail below, with reference to FIG. 2.

Before discussing the electrical interconnecting regions, it is useful to consider the relationship between the leaf switches and the transceivers. In the following discussion, it is sufficient to consider a single leaf switch, which may be connected to one or more fabric-side transceivers, though as will become clear, the features set out here with respect to one ("given") leaf switch apply equally well to all of the leaf switches in the array. Indeed, preferably, they apply to all of the leaf switches. In some embodiments, each leaf switch may be connected to more than one fabric-side transceiver (though in other embodiments, more than one leaf switch may be connected to each fabric-side transceiver). As discussed at the beginning of this section, the leaf switch has an array of fabric-side electrical ports, which are connected to the leaf-facing electrical ports of the fabric-side transceivers connected to that leaf switch. In preferred embodiments there is a one-to-one relationship between the fabric-side electrical ports of the leaf switch and the leaf-facing electrical ports on the set of fabric-side transceivers connected to that leaf switch, since this reduces redundancy of connections while maintaining non-blocking operation. The connections between the leaf-facing electrical ports of the fabric-side transceiver, and the fabric-side electrical ports of the leaf switch are provided by the second electrical interconnecting region, and may be in the form of at least one of: wires, cables, conductive traces (e.g. PCB conductive traces).

The situation for the relationship between the leaf switches and the client-side transceivers is similar. Again, it is sufficient to consider a single leaf switch. Each leaf switch may be connected to more than one client-side transceiver (though in some embodiments, more than one leaf switch may be connected to each client-side transceiver). The leaf switch has an array of client-side electrical ports, which are connected to the leaf-facing electrical ports of the client-side transceivers which are connected to that leaf switch. In preferred embodiments, there is a one-to-one relationship between the client-side electrical ports of the leaf switch and the leaf-facing electrical ports on the set of client-side transceivers connected to that leaf switch, again to reduce redundancy of connections while maintaining non-blocking operation. The connections between the leaf-facing electrical ports of the client-side transceiver, and the client-side electrical ports of the leaf switch are provided by the first electrical interconnecting region, and may be in the form of at least one of: wires, cable, conductive traces (e.g. PCB conductive traces).

Additional optional features are set out below which relate to the operation of the optoelectronic switch.

The client-facing optical ports may each include one or more, and preferably a plurality of physical lanes (i.e. optical lanes), so it may also be said that a given client-side transceiver may have a plurality of client-facing optical lanes, each client-facing optical port includes one or more of said optical lanes. As the name suggests, the optical lanes are arranged to convey optical signals. Correspondingly, each of the leaf-facing electrical ports may include a plurality of physical lanes (i.e. electrical lanes). In other words, a given client-side transceiver may have a plurality of leaf-facing electrical lanes, each leaf-facing electrical port including one or more of these lanes.

An optical signal, e.g. in the form of a packet of data, arriving at the client-facing optical port may be divided across the plurality of optical lanes of that client-facing optical port. The portions of the packet which are split over the plurality of lines may be referred to as "packet slices". The slicing of packets may be performed by the PCS sub-layer of the PHY layer of an Ethernet connection. By way of an example, a 400G port may include 4×1000 lanes, or a 100G port may include 4×25G lanes. Division of data in this manner is one of the factors that may allow wavelength-division multiplexing to be used. This is discussed in more detail later, particularly with reference to the fabric-side transceivers. In the following description, the term "data" is used to describe the substantive content of the packet to be switched, i.e. the payload. The term "information" may be used to refer to information about that data (i.e. metadata), which may include destination information specifying the destination external client device of that packet. Information in the packet may be stored in a packet header. Other information which may be stored in a packet header may include source/destination address, packet length, protocol version, sequence number, payload type, hop count, quality-of-service indicator and others. A single packet of data may include data which is intended for more than one destination external client device, though in preferred embodiments (and those which are described in detail in this application) each packet includes data intended for only a single external client device. In any event, the skilled person readily understands that virtually no modification is required in order to provide for packets having more than one external client device, intended as their destination. In light of the above, the optoelectronic switch of the present invention may be referred to as an optoelectronic packet switch.

As discussed above, the client-facing optical ports are arranged to receive an optical signal from an external client device. In some embodiments in which the signal is sliced over a plurality of lanes, each of these lanes has an associated optical-to-electrical (herein "O/E") converter, such as a photodiode, arranged to convert each optical signal into an electrical signal. Specifically, an optical signal may be sliced over a plurality of optical lanes into a first plurality of optical signal slices, each lane having an associated optical-to-electrical converter as discussed, where the optical-to-electrical converters are arranged to convert the first plurality of optical signal slices into a corresponding first plurality of electrical signal slices.

In other embodiments there may be an O/E associated with each client-facing optical port.

In either case, the optical signal arriving at the client-facing optical port is converted into an electrical signal (or plurality of electrical slice signals as defined above), preferably containing the same data and information. In preferred embodiments, the client-side transceivers are responsible only for conversion of the signal, and perform neither any packet processing nor active switching function. As a result of this, the devices may be considered transparent from the point of view of the link-level and networking layers.

The electrical signal (or plurality of electrical signal slices) may then be output at one of the leaf-facing electrical ports of the client-side transceiver, which may include one or more electrical lanes, each arranged to transmit one of the first plurality of electrical slice signals to the first electrical interconnecting region. In preferred embodiments, each client-side transceiver has the same number of client-facing optical ports and leaf-facing electrical ports. However, in some embodiments of the client-side transceivers, this is not the case. For example, there may be 4×1000 client-facing optical ports on one side, and 1×400G leaf-facing electrical port on the opposite side, e.g. as a result of the client-facing optical ports and the leaf-facing electrical ports being made up of different numbers of physical lanes, as discussed before. The crucial point here, as stressed above, is that the bisection bandwidth or total capacity is conserved across the transceiver. Clearly, in such cases where there are different numbers of client-facing optical ports and leaf-facing electrical ports, transmission of data in one direction may inevitably involve going from one or more faster ports to one or more slower ports. In order to accommodate for this, the transceivers are preferably able to perform buffering, and may for example include a memory where data may be temporarily be stored, though this may not be necessary in embodiments in which there is a one-to-one relationship between the client-facing optical ports and the leaf-facing electrical ports. A one-to-one relationship between the client-facing optical ports and the leaf-facing electrical ports is preferred, and accordingly, the electrical signals output from the latter preferably include the same data as the optical signals which entered at the client-facing optical ports, albeit now in electrical form.

The electrical signal(s) generated by the client-side transceiver is (are) sent to the client-side electrical ports of the leaf switch via the first electrical interconnecting region. Accordingly, the output from the client-side transceiver may be in the form of an array or plurality of electrical signals (the plurality of electrical signals here does not refer to a plurality of electrical signal slices, rather a plurality of electrical signals corresponding to the optical signals received at the client-facing optical ports of the client-side transceiver), the data contained therein corresponding to the data in the optical signals incident at the client-facing optical ports of the client-side transceivers. As for the client-facing optical ports and leaf-facing electrical ports of the client-side transceiver, it is preferred that each of the client-side electrical ports of the leaf switch includes a plurality of physical lanes (i.e. electrical lanes). In other words, a given leaf switch may have a plurality of client-side electrical lanes, each client-side electrical port including one or more of these lanes. The first electrical connecting region provides connections between the leaf-facing electrical ports of the client-side transceiver and the client-side electrical ports of the leaf switch. The first electrical interconnecting region provides a connection between each of the electrical lanes making up the leaf-facing electrical ports of the client-side transceiver, and the corresponding electrical lanes making up the client-side electrical ports of the leaf switch.

It should be noted now and throughout this application that not all of the ports need be in action at once, i.e. an optical signal need not arrive at all of the client-facing optical ports on a given leaf switch. However, the present invention is able to accommodate optical signals arriving at each of the client-facing optical ports at the same time.

The electrical signal or signals then arrive at the client-side electrical ports of the leaf switch to which that transceiver is connected. Broadly speaking, the purpose of the leaf switch is to direct the electrical signal which is incident at one of its client-side electrical ports towards one of its fabric-side electrical ports in a manner which ensures that it is transmitted to the correct spine switch. In some embodiments, the leaf switch may also be configured to indicate to which fabric-facing optical port of a particular fabric-side transceiver a given electrical signal should be ultimately routed, in order to arrive at the desired spine switch. This is discussed in greater detail later on.

This routing of the signal may be based on the destination information contained within a given packet or packet header. Two distinct processes may be performed by the leaf switch: packet processing (e.g. on ingress deciding on how to treat a packet, including looking up the destination of a packet based on its header and on egress updating the packet header. The spine has some of this as well, but may be in a light-weight form as client ports generally require more processing than fabric ports) and electrical switching. It should be noted that the processes which occur in the leaf switch take place at "port level". In other words, in embodiments in which individual slices appear at the client-side electrical lanes of the leaf switch, these are first combined into one electrical signal per client-side electrical port. In other words, the leaf switch may be arranged to combine the first plurality of electrical slice signals into a single first electrical switching signal per client-side electrical port of that leaf switch. The recombination may be performed by a separate recombination module, or it may be performed at the PCS layer of each port.

To understand the operation of the leaf switch, it is necessary only to consider the switching of a single electrical signal, herein referred to as a "first electrical switching signal". It should be noted (again) that the first electrical switching signal is a full electrical signal, and not an electrical signal slice. In other words, it corresponds to one of the optical signals which initially arrived at the client-facing optical ports of a particular client-side transceiver.

The leaf switches are preferably capable of active switching functionality, and may for example be in the form of electrical packet switches (EPS) such as electrical crossbar switches or shared memory switches. In order to effect switching of the first electrical switching signal, the leaf switch in question preferably includes a first switching part having inputs and outputs, which correspond respectively to the client-side electrical ports and the fabric-side electrical ports.

In order to approach its destination external client device (via other components), the first electrical switching signal by be switched from one of the inputs to an output of the first switching part. The leaf switch may include a routing module arranged to determine, based on the destination information contained in the first electrical switching signal, to which output the first electrical switching signal should be directed. In some embodiments, the determination may include performing a routing lookup. Once the appropriate first switching part output (and accordingly, the appropriate fabric-side electrical port) has been determined, the first switching part is configured to direct the first electrical switching signal from the input to output.

The first switching electrical signal may now be referred to as the "first switched electrical signal", and has arrived at the fabric side of the optoelectronic switch. Like the client-side electrical ports of the leaf switch, the fabric-side electrical ports of the leaf switch may each include a plurality of physical lanes (i.e. electrical lanes. In other words, the leaf switch may include a plurality of fabric-facing electrical lanes, each fabric-side electrical port including one or more of these lanes. The leaf switch may be arranged to slice the first switched electrical signal into a second plurality of electrical slice signals, each of which is output at one of the fabric-side electrical lanes.

The same is true of the fabric-side transceivers, in which the leaf-facing electrical ports may each include a plurality of physical lanes (i.e. electrical lanes). In other words, a given fabric-side transceiver may have a plurality of leaf-facing electrical lanes, each leaf-facing electrical port including one or more of these lanes each arranged to receive a respective electrical slice signal from the second electrical interconnecting region. Similarly, the fabric-facing optical ports may each include a plurality of physical lanes (i.e. optical lanes), so it may also be said that a given fabric-side transceiver may have a plurality of fabric-facing optical lanes, each fabric-facing optical port including one or more of said optical lanes.

The second electrical interconnecting region provides connections between the leaf-facing electrical ports of the fabric-side transceiver and the fabric-side electrical ports of the leaf switch. The second electrical interconnecting region provides a connection between each of the electrical lanes making up the leaf-facing electrical ports of the fabric-side transceiver, and the corresponding electrical lanes making up the fabric-side electrical ports of the leaf switch.

Accordingly, the leaf-facing electrical ports of the fabric-side transceiver are arranged to receive a first switched electrical signal from a fabric-side electrical port of the leaf switch. In some embodiments, the first switched electrical signal is divided into the second plurality of electrical slice signals, spread over a corresponding plurality of electrical lanes making up the leaf-facing electrical port. The fabric-side transceivers play a similar role to the client-side receivers, but in reverse. Specifically, each electrical lane on a given leaf-facing electrical port may include an electrical-to-optical (herein "E/O") converter arranged to convert the slice of the first switched electrical signal on that lane into an optical signal, i.e. to convert the second plurality of electrical slice signals into a corresponding second plurality of optical slice signals.

In preferred embodiments, the E/O converters may be in the form of modulators, such as phase modulators or intensity modulators, for example electro-absorption modulators (EAMs), Franz-Keldysh modulators, modulators based on the quantum Stark effect or Mach-Zehnder modulators. Each modulator may be associated with a light source, and in some embodiments, a single light source may serve as an input to a plurality of modulators. The modulator may be configured to receive an electrical signal, and unmodulated light from the light source. By combining the two, the modulator may generate a modulated optical signal having the same wavelength as the unmodulated light from the light source. The light source is preferably in the form of a laser, in order to generate a substantially monochromatic beam of light restricted to a narrow band of wavelengths. To minimize losses, the modulators are preferably configured to receive light having a wavelength in the C-band or the L-band of the electromagnetic spectrum, i.e. from 1530 nm to 1625 nm, or light having a wavelength in the 1310 nm band. More preferably, the light has a wavelength falling within the C-band or "erbium window", having a wavelength from 1530 nm to 1565 nm.

The laser may be either a fixed-wavelength or tunable laser.

In addition to converting signals from electrical signals to optical signals, in preferred embodiments of the present invention, the fabric-side transceivers preferably have additional functionality. Specifically, unlike the client-side transceivers, it is preferred that the fabric-side transceivers have active switching capability (having the same definition as earlier in the application). In particularly preferred embodiments, the fabric-side transceivers may have selection capability in addition to active switching capability. This is explained in more detail below.

In the following description, it should be understood that "upward" switching refers to switching in the direction from leaves to spines, and "downward" switching refers to switching in the direction from spines to leaves. In the present invention, there is an array of (i.e. more than one) fabric-facing optical ports on each fabric-side transceiver. Accordingly, one of those ports will need to be selected for a given electrical signal or a plurality of electrical signals.

Preferably, this selection is performed so as to equalize the load across the fabric-facing optical ports of a given transceiver. In addition, it is preferred that the order of electrical signals belonging to the same flow be preserved. This may be achieved by selecting the same fabric-facing optical port for electrical signals of the same flow. Here, the electrical signals belonging to the same flow may be identified by information which is stored in that electrical signal, e.g. in a packet header. For example, in the case of a TCP/IP packet, the identification may be based on a tuple of packet header fields including: source MAC, destination MAC, Ethertype, source IP, destination IP, source port, and destination port. In some embodiments, selection may be performed by creating a hash of the chosen tuple and selecting the fabric-facing optical ports based on the hash value. In embodiments in which ordering electrical signals is not as important a concern, or not a concern at all, the selection may be performed independently of information in the packet header, e.g. in a random or round-robin fashion. Selection of the fabric-facing optical port may also be adaptive, based on network traffic conditions.

Throughout the above paragraph, we refer to "selection" of a fabric-facing optical port. This "selection" process may be performed either by the fabric-side transceiver itself, or by the leaf switch. In embodiments in which the leaf switch is arranged to perform the selection of the fabric-facing optical port, the leaf switch may be configured to add a tag to the electrical signal in order to inform the fabric-side transceiver of the output of the selection. It should be noted that if the selection is performed by the leaf switch, then the fabric-side transceiver does not require any selection capability. It requires only switching capability.

When a packet is moving from a slower input port to a faster output port, the fabric-side transceiver must ensure that the electrical signal is transmitted without gaps at the faster output port. In order to achieve this, the fabric-side transceiver may be configured to perform buffering before starting transmission at the output port. The same may apply in the opposite.

Similarly, when moving from a faster input port to a slower output port, the fabric-side transceiver must ensure that the slower output port can keep pace with the faster input port. So, again, the fabric-side transceiver may be configured to provide a buffer at the slower output port to temporarily buffer a packet, or a fraction of a packet, until the output port is no longer busy.

As is shown in FIG. 2, the optical interconnecting region may convey the second plurality of optical slice signals at lane level, by providing a connection between each of the optical lanes making up the fabric-facing optical ports of the fabric-side transceiver and the corresponding optical lanes making up the fabric-side optical ports of the spine switch. The optical interconnecting region is preferably a passive component, i.e. it performs no active function which directs the signal from a given input to a given output. Preferably, it is in the form of a fibre shuffle. This is possible since the only switching required is performed by the leaf switches and the spine switches. In some embodiments, the optical interconnecting region may be arranged to employ wavelength-division multiplexing (WDM), in order to reduce the fibre count. For example, each fabric-facing port of the fabric-side transceivers may include a multiplexer such as an AWG, which is arranged to combine the plurality of optical signal slices which are part of a given optical signal, onto a single fibre. In order to do so, the E/O converter is preferably arranged to convert each of the plurality of electrical signal slices to an optical signal slice wherein each of the optical signal slices has a different wavelength.

At this point, the switched electrical signal has been sliced (e.g. by the PCS layer of an Ethernet connection, or using a separate module) into a plurality of slices, each conveyed in a respective electrical lane, each of which is then converted into an optical signal slice, to generate a plurality of optical signal slices. The plurality of optical signal slices between them contain the same data as the original packet of data which entered the initial client-facing optical port, though the information contained in the packet may have been changed during packet processing or electrical switching. In embodiments in which the optical signal is in the form of a packet of data, having a packet header containing destination information, the packet header may also be sliced over the plurality of optical signal slices. Since all of the optical signal slices which make up a given optical signal are transmitted together, and are recombined, the fact that each slice does not include its own destination information does not detrimentally affect the invention. The plurality of optical signal slices which together correspond to the original switched electrical signal, are each transmitted to a single spine switch.

To understand the operation of the spine switches of the present invention, it is sufficient to consider a single optical signal. It should be stressed here that the single optical signal does not refer to an optical signal slice.

The optical signal is received at one of the fabric-facing optical ports of the spine switch. In some embodiments, each of the spine switches is a relatively small switching element, each of the fabric-facing optical ports preferably having the same capacity as each of the fabric-facing optical ports of the fabric-side transceivers. It should be noted that in some embodiments, in which the optical interconnecting region is arranged to employ wavelength-division multiplexing, each fabric-facing electrical port preferably includes a demultiplexer such as an AWG which is arranged to separate the multiplexed optical signal into its constituent plurality of optical signal slices.

The spine switches are preferably in the form of optoelectronic packet switches (OEPS), which is used herein to refer an active switching element which includes both optical and electrical components. In preferred embodiments of the present invention, the actual switching preferably takes place in the electrical domain. The spine switches preferably include three parts: a receiving side including an O/E converter, a switching part having inputs and outputs, and a transmission side including an E/O converter. The switching part may be in the form of an electrical packet switch such as an electrical crossbar switch or a shared memory switch. In preferred embodiments of the present invention the receiving side, switching part and transmission side of the spine switch are integrated into a single switch module. By "integrated into a single module", we mean that there is a close physical proximity between switching module and the transmission side, and further that there is a close proximity between the switching module and the receiving side. More specifically, each of the spine switches may include:

a receiving side having a respective optical-to-electrical converter associated with each of the fabric-facing optical ports of the spine switch and arranged to convert an optical signal arriving at that port into an electrical signal;

a switching part having inputs each input arranged to receive an electrical signal from an optical-to-electrical converter on the receiving side of the spine switch and outputs; and a transmission side having a respective electrical-to-optical converter associated with each of the fabric-facing optical ports of the spine switch, and arranged to convert an electrical signal arriving at that port from the switching part into an optical signal, whereupon it may be transmitted to the optical interconnecting region.

Specifically, the O/E converter on the receive side and the inputs of the switching part may be separated by a first proximity. The outputs of the switching part and the E/O converter of the transmission side may be separated by a second proximity. In preferred embodiments, the first and second proximity are small. One or both of the first and second proximity may be less than 10 mm, more preferably less than 8 mm, more preferably less than 6 mm, more preferably less than 4 m and more preferably still less than 2 mm. In some embodiments this may be achieved by packaging a CMOS switch ASIC die along with multiple SiPh dies in the same package.

Each of the fabric-facing optical ports of the spine switch has an associated O/E converter which is arranged to convert an optical signal arriving at that port into a second electrical switching signal. The receiving side O/E converter may be connected to the inputs of the switching part, and the second switching electrical signal is transmitted thereto.

Like the leaf switches, the switching part of the spine switch is arranged actively to direct the second electrical switching signal from one of its inputs to one of its outputs, based on a routing look-up. The switching part may include an ingress packet processor (IPP) which is configured to perform the routing look-up. Preferably there is an IPP associated with each of the switching part inputs, so that the determination may be performed upon arrival of the second electrical switching signal at that switching part input. The ingress packet processor may be further configured to perform other roles such as checking the integrity of the data contained in the incoming electrical switching signal, and checking whether to admit/drop the signal based thereon. The switching part, once the selected output is determined by the IPP, is then arranged to direct the second electrical switching signal to that output of the switching part.

The switching part may also include an egress packet processor (EPP) which may be arranged to perform functions such as modification of the packet header of the second electrical switching signal before subsequent transmission. In some cases, due to the nature of the incoming data, bottlenecking may occur where the second electrical switching signals from more than one of the O/E converters are directed towards the same switching part output. In order to avoid losing data when such a situation arises, the switching module is preferably able to buffer data if necessary, to temporarily store it before sending it from the desired output. Accordingly, the switching part may include, or be associated with a storage portion such as a memory.

Each switching part output is preferably connected to the transmission side, and accordingly the second electrical switching signal, arriving at that switching part output, is then transmitted towards a transmission side E/O converter. Like its counterpart on the receiving side, the transmission side E/O converter is arranged to convert the second electrical switched signal an optical output signal containing the same data and information as the second electrical switching signal. In some embodiments, there is a one-to-one relationship between the switching part outputs and the transmission side E/O converters.

In embodiments in which optical signal slices are transmitted from the fabric-facing optical ports of the spine switches to the fabric-facing optical ports of the leaf switches, it should be noted that, the routing look-up on the spine switches is arranged to direct all of the optical signal slices corresponding to a given optical signal towards the same fabric-facing optical port of a fabric-side transceiver.

The optical signal slices may then be transmitted from the fabric-facing optical port to which they were directed by the switching part of the spine switch in question, to the fabric-facing port of the fabric-side transceiver which is connected to the leaf switch to which the destination external client device is connected.

As previously discussed, in some embodiments, the optical interconnecting region may be arranged to employ wavelength-division multiplexing (WDM), in order to reduce the fibre count. So, each fabric-facing optical port of the spine switches may include a multiplexer such as an AWG, which is arranged to combine the plurality of optical signal slices which are part of a given optical signal, onto a single fibre.

The fabric-side transceivers preferably also contain O/E converters, and specifically, they may contain an O/E converter for every one of the fabric-facing optical lanes, making up the fabric-facing optical ports. These O/E converters are arranged to convert the plurality of optical signal slices arriving respectively at the fabric-facing optical lanes, into a corresponding plurality of electrical signal slices.

In embodiments in which the optical interconnecting region employs wavelength-division multiplexing, each fabric-facing optical port of the fabric-side transceivers may include a demultiplexer such as AWG to separate a given optical signal into its constituent plurality of optical signal slices for subsequent transmission.

The leaf-facing electrical ports of the fabric-side transceivers are arranged to receive said plurality of electrical signal slices, which correspond to the packet slices which were generated earlier on during the switching process, e.g. by the PCS sub-layers on the client-side transceivers or the leaf-switches. Then, the plurality of electrical signal slices may be recombined into the original packets of data from which they were originally formed, for example by the PCS sub-layer of the PHY layer in an Ethernet connection. The resulting electrical signal preferably corresponds to the original packet of data, i.e. it preferably includes the same data, though the information may have been changed along the way, e.g. by the packet processors on the leaf or spine switches. The electrical signal may then be transmitted from the leaf-facing electrical ports of the fabric-side transceiver to the fabric-side electrical ports of the leaf switch via the second electrical interconnecting region.

For "downward" switching, if there is more than one leaf-facing port per fabric-side transceiver, one of these ports will need be selected for a given packet. The same considerations apply as for the "upward" switching, and will not be repeated here. It should be noted that in the downward direction, the packet will always be routed to the same leaf switch, the selection only determines the fabric-side electrical port of the leaf switch at which the signal arrives. This in contrast to the upward direction, wherein the selection of which fabric-facing optical port is used determines the spine switch at which the signal arrives.

The electrical signal(s) (not slices) generated by the fabric-side transceiver are sent to the fabric-side electrical ports of the leaf switch via the second electrical interconnecting region. Accordingly, the output from the fabric-side transceiver may be in the form of an array or plurality of electrical signals, the data contained therein corresponding to the data in the optical signals initially incident at the fabric-facing optical ports of the fabric-side transceivers. As for the fabric-facing optical ports and leaf-facing electrical ports of the fabric-side transceiver, it may be that each of the fabric-side electrical ports of the leaf switch includes a plurality of physical lanes (i.e. electrical lanes. In other words, a given leaf switch may have a plurality of fabric-side electrical lanes, each fabric-side electrical port including one or more of these lanes. The second electrical connecting region provides connections between the leaf-facing electrical ports of the fabric-side transceiver and the fabric-side electrical ports of the leaf switch. The second electrical interconnecting region provides a connection between each of the electrical lanes making up the leaf-facing electrical ports of the fabric-side transceiver, and the corresponding electrical lanes making up the fabric-side electrical ports of the leaf switch.

The electrical signal or signals then arrive at the fabric-side electrical ports of the leaf switch. Broadly speaking, the purpose of the leaf switch at this point, as during the switching in the opposite direction, is to direct the electrical signal which is incident at one of its fabric-side electrical ports towards one of its client-side electrical ports in a manner which ensures that it is then transmitted to the correct destination external client device. This routing of the signal may be based on the destination information contained within a given packet or packet header.

Once again, two distinct processes may be performed by the leaf switch: packet processing and electrical switching. It should be noted again that the processes which occur in the leaf switch take place at "port level". In other words, fabric-side electrical signal slices are first combined into one electrical signal per client-side electrical port. These recombination may be performed by a separate recombination module, or it may be performed at the PCS layer of each port.

To understand the operation of the leaf switch, it is necessary only to consider the switching of a single electrical signal, herein referred to as a "third electrical switching signal". The leaf switches are preferably capable of active switching functionality, and may for example be in the form of electrical packet switches (EPS) such as electrical crossbar switches or shared memory switches. In order to effect switching of the third electrical switching signal, the leaf switch in question preferably includes a second switching part having inputs and outputs, which correspond respectively to the fabric-side electrical ports and the client-side electrical ports. In some embodiments, the second switching part of the leaf switch may be the same as the first switching part.

In order to approach its destination external client device (via other components), the third electrical switching signal may be switched from one of the inputs to an output of the second switching part. The leaf switch may include a second routing module arranged to determine, based on the destination information contained in the third electrical switching signal, to which output the second electrical switching signal should be directed. In some embodiments, the determination may include performing a routing lookup. Once the appropriate switching part output (and accordingly, the appropriate client-side electrical port) has been determined, the second switching part is configured to direct the third electrical switching signal from the input to output.

The third switching electrical signal may now be referred to as the "third switched electrical signal", and has arrived at the client side of the optoelectronic switch. As discussed, like the fabric-side electrical ports of the leaf switch, the client-side electrical ports of the leaf switch may each include a plurality of physical lanes (i.e. electrical lanes). In other words, as discussed previously, the leaf switch may include a plurality of client-facing electrical lanes, each client-side electrical port including one or more of these lanes.

As with switching in the opposite direction, the first electrical interconnecting region provides connections between the leaf-facing electrical ports of the client-side transceiver and the client-side electrical ports of the leaf switch. The first electrical interconnecting region provides a connection between each of the electrical lanes making up the leaf-facing electrical ports of the client-side transceiver, and the corresponding electrical lanes making up the client-side electrical ports of the leaf switch.

Accordingly, the leaf-facing electrical ports of the client-side transceiver are arranged to receive the third switched electrical signal from a client-side electrical port of the leaf switch. In some embodiments, the third switched electrical signal is divided over a plurality of electrical lanes making up the leaf-facing electrical port. The client-side transceivers play a similar role to the fabric-side transceivers, but in reverse. Specifically, each electrical lane on a given leaf-facing electrical port may include an electrical-to-optical (herein "E/O") converter arranged to convert the slice of the third switched electrical signal on that lane into an optical signal. It should be noted that it is preferred that the client-side transceivers represent passive components, with no active switching capability, in contrast to the leaf switches and the fabric-side transceivers.

By this point, the optical signals corresponding to the slices incident upon the leaf-facing electrical ports of the client-side transceiver preferably arrive at the client-facing optical ports of that transceiver. Specifically, due to the routing look-ups performed by the leaf switches and the spine switches via which the signal has travelled, the optical signals are incident upon the client-facing optical port which is connected to the destination external client device. In preferred embodiments, as discussed, the client-facing optical port in question includes a plurality of physical (i.e. optical) lanes, and one of the plurality of signals is incident at each of the physical lanes in question. From here, the signals may be combined into a single signal containing the same data as the original packet of data, e.g. by the PCS sub-layer of the PHY layer of an Ethernet connection, whereupon they may be transmitted to the destination external client device.

A further aspect of the invention is directed towards a spine switch module which may be used in optoelectronic switches of the first aspect of the present invention. As may be apparent from the foregoing description, the physical structure of the spine switches provides numerous advantages for the present invention. Specifically, the spine switch may include an integrated circuit, preferably in the form of a CMOS chip, the integrated circuit having a first portion having an array of electrical inputs (which may be referred to as receiving side circuits, receiver circuits or Rx circuits), each electrical input configured to receive an electrical signal from O/E converters which are associated with the fabric-facing optical ports of the spine switch; and a second portion having an array of electrical outputs (which may be referred to as transmission side circuits, transmission circuits or Tx circuits), each electrical output configured to transmit an electrical signal to a respective E/O converter on associated with one of the fabric-facing optical ports of the spine switch; wherein the first portion is located at a first side of the integrated circuit, and the second portion is located at a second side of the integrated circuit, the first side different from the second side. It is preferred that the first side is opposite the second side, in order to maximize the distance between the electrical inputs and the electrical outputs on the CMOS chip. The advantages of this arrangement are described in more depth later on this application.

Another aspect of the invention is directed towards the integrated circuit itself.

The integrated circuit preferably includes the features described above, namely the switching part of the spine switch, and the ingress/egress packet processors. The advantage here is provided by the fact that the inputs/outputs, the packet processors and the switching part may all be provided in the form of a single integrated unit, which is arranged to receive signals from the E/O converters, perform active switching, and then output them to the O/E converters of the spine switches.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
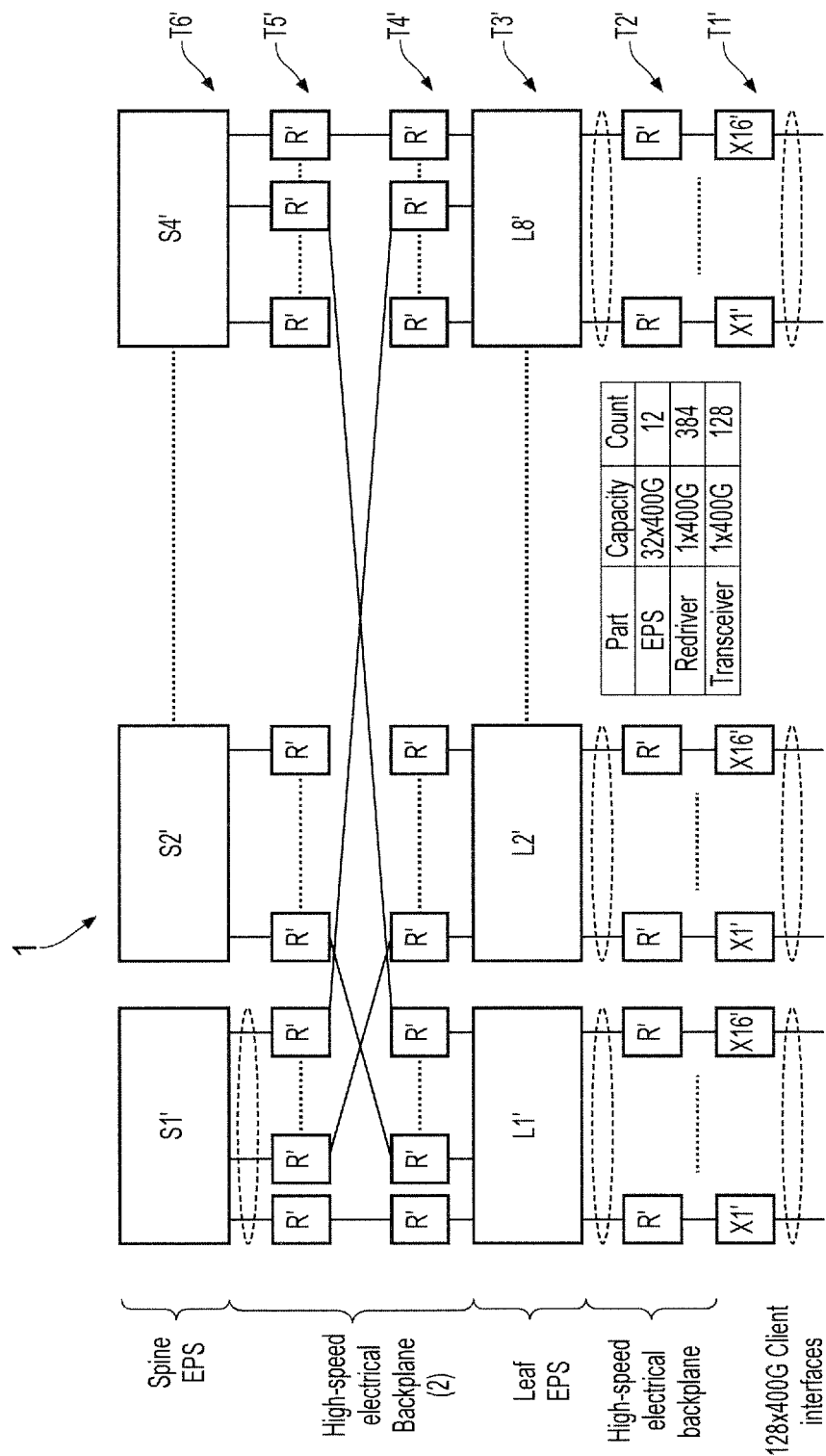
FIG. 1 shows an example of a known chassis switch in which all switching takes place in the electronic domain. This drawing is described in detail in the "Background" section above.
Figure 2:
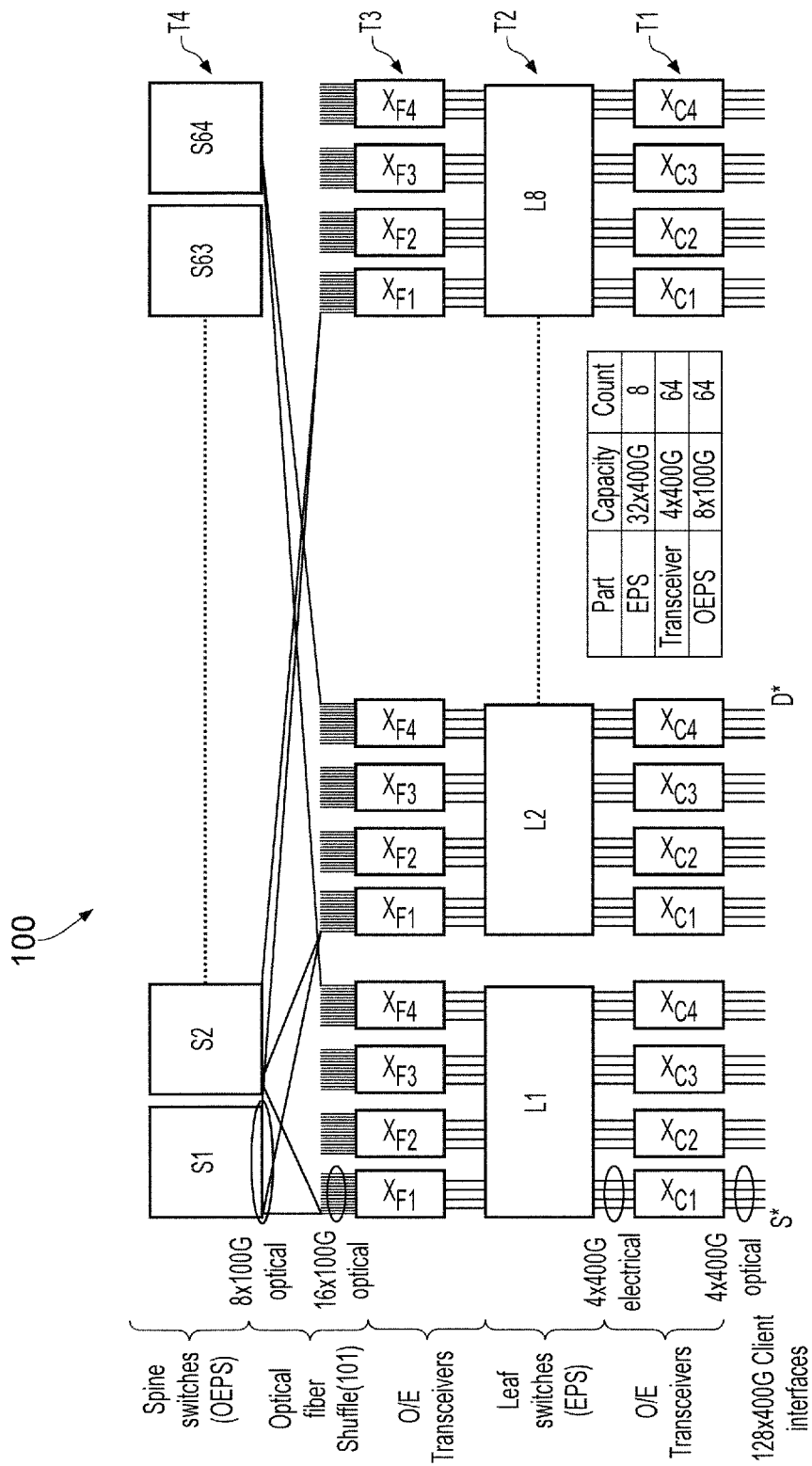
FIG. 2 shows an example of the configuration of the components of the optoelectronic switch of the present invention, according to one embodiment.

An embodiment of an optoelectronic switch according to the first aspect of the invention is shown in FIG. 2. The optoelectronic switch 100 of FIG. 2 is centred around optical transmission, rather than electrical switching, as was shown in FIG. 1. Specifically, this is achieved by using the optical fibre shuffle 101, which will be described in more detail later. Again, the optoelectronic switch may be considered to include a number of different tiers of components, namely tier T1 including an array of client-facing transceivers $X_{C1}$ to $X_{C4}$, tier T2 including eight leaf switches L1 to L8, tier T3 including an array of fabric-facing transceivers $X_{F1}$ to $X_{F4}$, and tier T4 including an array of spine switches S1 to S64. In this embodiment, the leaf switches L1 to L8 are electronic packet switches (EPS), and the spine switches S1 to S64 are optoelectronic packet switches (OEPSs) having integrated optical inputs and outputs (I/O).

Each leaf switch L1 to L8 has sixteen client-facing ports 1 to 16, and sixteen fabric-facing ports 1 to 16. Each leaf switch e.g. L1 is connected to each of the spine switches S1 to S64 via the fabric-facing transceivers $X_{F1}$ to $X_{F4}$ and the optical fibre shuffle 110. In other words, the fibre shuffle 110 provides full mesh connectivity between the leaf switches L1 to L8 and the spine switches S1 to S64. In the specific embodiment shown, the fibre shuffle 110 includes five hundred and twelve optical fibres, to ensure that there is a path between every leaf switch L1 to L8 and every spine switch S1 to S64. The fibre shuffle 110 is a passive optical backplane, and between the fabric-facing transceivers $X_{F1}$ to $X_{F4}$ on each leaf switch L1 to L8, and the spine switches S1 to S64, there is no active switching required. Each spine switch S1 to S8 has eight fabric-facing ports, each of which is connected to a fabric-facing transceiver $X_{F1}$ to $X_{F4}$ on each of the leaf switches L1 to L8. So, by a leaf switch L1 to L8 selecting an appropriate transceiver $X_{F1}$ to $X_{F4}$ to which to direct the electrical signal, and then by selecting an appropriate output of that transceiver, the signal may be sent to whichever of the spine switches S1 to S64 is desirable. And, when sending the signal back to a destination leaf switch L1 to L8, the same applies in reverse, i.e. the signal is sent from the spine switch S1 to S64 to a fabric-facing transceiver $X_{F1}$ to $X_{F4}$ connected to an appropriate leaf switch L1 to L8, whereupon the appropriate client-facing transceiver $X_{C1}$ to $X_{C4}$ is selected, to send the signal to its intended destination external client device.

As with FIG. 1 in the Background section above, it is instructive to describe the optoelectronic switch 100 of FIG. 2 by considering the operation of the switch 100 as an optical signal is transferred from a source external client device S* to a destination external client device D*.

Source external client device S* is connected to input 1 of client-facing transceiver $X_{C1}$, the four outputs 1 to 4 of which are connected respectively to client-facing ports 1 to 4 of leaf switch L1. The optical signal is converted into an electrical signal by client-facing transceiver $X_{C1}$, and the electrical signal is transmitted to client-facing port 1 of leaf switch L1. In this example, the signal will be transported from source S* to destination D* via spine switch S1, though it is important to note that it is possible for this journey to be made via any one of the spine switches S1 to S64. In order to direct the (now electrical) signal towards spine switch S1, the leaf switch L1 switches the signal to fabric-facing transceiver $X_{F1}$ (which is the only one of the fabric-facing transceivers $X_{F1}$ connected to L1, which is connected to spine switch S1) whereupon it is converted into an optical signal. The optical signal is directed towards the leftmost output of fabric-facing transceiver $X_{F1}$, which is the only one connected to spine switch S1. The optical signal then traverses the fabric via the fibre shuffle 110, before arriving at spine switch S1. Herein, the signal is switched to another fabric-facing port of spine switch S1, specifically that port which is connected to a fabric-facing transceiver $X_{F1}$ to $X_{F4}$ on leaf switch L2. In this example, the optical signal is transmitted to fabric-facing transceiver $X_{F1}$, since transceivers $X_{F2}$, $X_{F3}$ and $X_{F4}$ do not have any connections to spine switch S1. Fabric-facing transceiver $X_{F1}$ converts the optical signal back into an electrical signal, and transmits it to e.g. the left most fabric-facing port of leaf switch L2. In leaf switch L2, the signal is directed towards client-facing port 16, which is connected to client-facing transceiver $X_{C4}$. When the signal reaches client-facing transceiver $X_{C4}$, it is converted back into an optical signal, and transmitted towards the destination external client device at D*.

Figure 3:
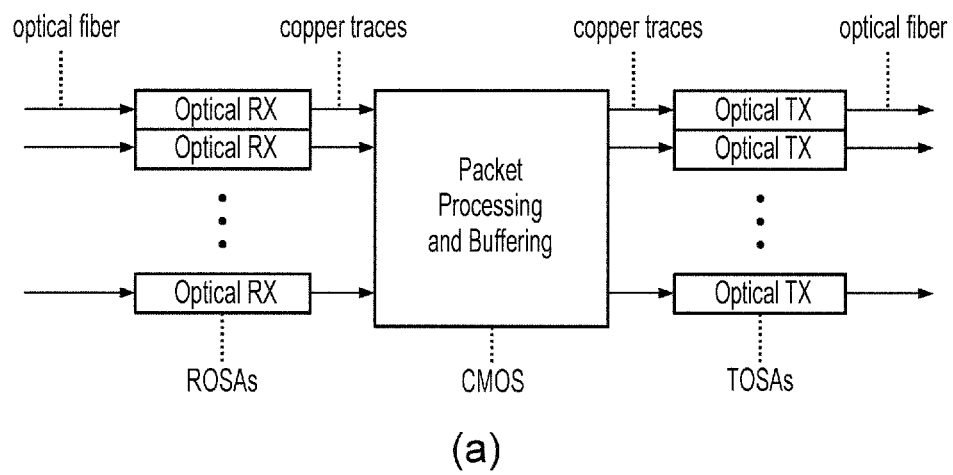
FIGS. 3A and 3B show a comparison of known spine switches, and the spine switches of the present invention. In particular the integrated optical IOs are highlighted.
Figure 3:
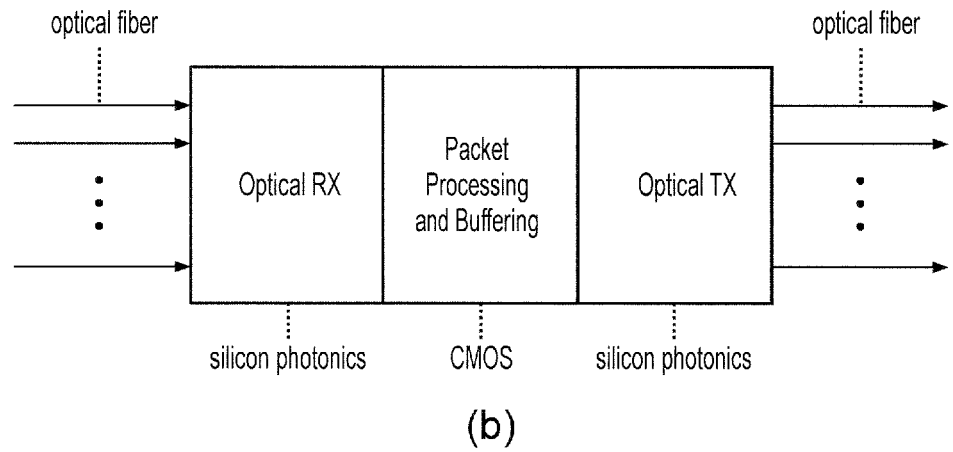

FIGS. 3A and 3B illustrate schematically the integrated nature of the spine switches, or OEPSs, which are employed in embodiments of the optoelectronic switch of the present invention. The switching elements shown in FIGS. 3A and 3B broadly include three parts: an optical receiving side denoted "Optical RX" (referred to herein as "Rx"), a packet processing and buffering module, and an optical transmission side denoted "Optical TX" (referred to herein as "Tx"). As should be evident from the drawings, the difference between the switching elements shown in FIGS. 3A and 3B is the implementation of these three parts.

FIG. 3A shows an example of a conventional switching element arrangement. Here, the optical Rx is formed of a plurality of separate modules, each having an input from an optical fibre. The optical Rx are configured to convert optical signals received from the optical fibres, e.g. by means of a photodiode, into an electrical signal. The electrical signal is then conducted to the packet processing and buffering module via copper traces. In the embodiment shown, the packet processing and buffering module is embodied in a CMOS chip. The structure and function of the packet processing and buffering module will be described in more detail elsewhere in the application. For the purposes of this part of the description, it is sufficient to note that the packet processing and buffering module switches the signal in the electrical domain to an output, whereupon it is transmitted via another copper trace to one of the array of optical Tx. The optical Tx convert the electrical signals into optical signals, for instance using an EAM, and they are then transmitted towards their destination leaf switch using the second array of optical fibres shown. Crucially, in the configuration shown in FIG. 3A, the optical Rx and the optical Tx are formed as separate components from the packet processing and buffering module, connected to it by copper traces.

In contrast, FIG. 3B shows an integrated OEPS which may be used as a spine switch in an optoelectronic switch of the present invention. As is shown, the OEPS still includes the optical Rx, the packet processing and buffering module and the optical Tx. However, in the OEPS of FIG. 3B, these are all integrated into a single switching element. By combining the elements into a single switching element, i.e. providing an integrated chip having optical inputs and outputs, several advantages are provided, as described in the previous section.

Figure 4:
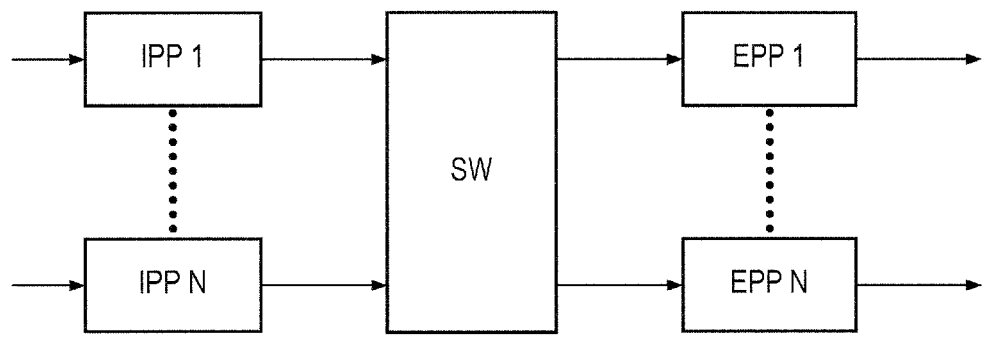
FIG. 4 shows a more detailed schematic of the packet processing and buffering module of FIG. 3B.

Before discussing the structure of the switching elements shown in FIGS. 3A and 3B in more detail, FIG. 4 shows a more detailed configuration of the packet processing and buffering module of FIG. 3B in particular. The packet processing and buffering module shown is made of three parts, an array of ingress packet processors IPP1 to IPPN (referred to just as IPP, for brevity), a switching and buffering module SW and an array of egress packet processors EPP1 to EPPN (referred to just as EPP, for brevity). Each of the ingress packet processors IPP receives, as its input an electrical signal generated by a photodiode (or other photodetector) in the optical Rx. For each packet of data arriving at it, the ingress packet processor IPP at least checks the integrity of each incoming frame, checks whether or not to admit the frame, and performs a routing lookup. The output or result of the routing lookup is a port of the OEPS to which the packet/frame of data should be sent, in order to direct it towards its destination leaf switch or destination external client device. Then, the switching and buffering module SW switches the packet to the port indicated by the routing lookup. Where there is a local bottleneck (or for other reasons), the switching and buffering module SW may also perform buffering. The nature of the functions performed by the switching and buffering module SW are described in more detail elsewhere in the application. The packet or frame of data is then transmitted to the egress packet processor EPP which may, for example, modify the packet header, before sending the packet/frame of data to the optical Tx, whereupon it is converted back into an optical signal, and transmitted to the optical fabric. The means by which the optical-to-electrical and electrical-to-optical conversions take place are described in more detail with reference to FIG. 5 below.

Figure 5:
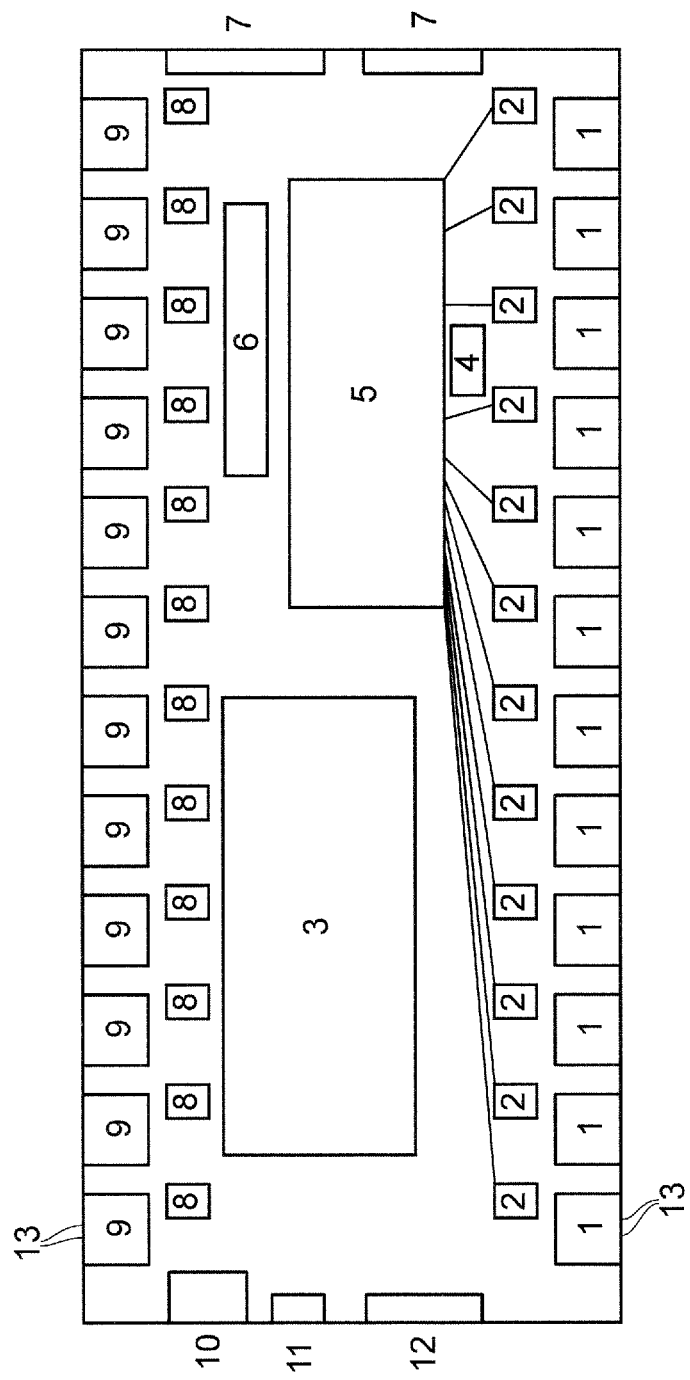
FIG. 5 shows a typical layout of a CMOS chip which may form part of the spine switch.

FIG. 5 shows a typical layout of a CMOS chip according to this invention.

The CMOS chip is designed to be in close proximity to one or more silicon photonic chips. The silicon photonic chips provide photodetectors and optical modulators which provide the electric signals to and the from the CMOS chip. The CMOS die implements traditional packet processing, buffering and switch functionality as well as the analog circuitry for required input and output (I/O) of the chip.

The CMOS chip may have 12 ports of 100G. Each 100G port may be made up of 4×25G lanes.

In FIG. 5 the receiver circuits are shown as 1, connected to the silicon photonics detector chip by bonds 13, which may, for example, be short wire bonds 13. The electrical connections could be of other types for example pads or vias. The transmitter circuits are shown as 9. The receiver circuits include a trans-impedance amplifier and Clock and Data Recovery circuitry (analog mixed signal). The receiver circuits also contain Ethernet MAC and PCS (Physical Coding Sublayer). The transmitter circuits contain the Ethernet MAC and PCS. In this arrangement, the MAC/PCS is divided into Rx and Tx parts whereas it is more usual to have them in the same region of the chip.

Each receiver circuit 1 may be connected to a packet processor ingress circuit 2 which arranges the incoming packets for transmission to the Longest Prefix Matching (LPM) block 5. The packet processor will locate and extract the packet's header fields and filter them so that packets are then sent to the classifier. The classifier implements an access control list which means that it tests the header fields against a set of rules to determine how the packet should be handled. Packets for onward transmission are sent to the LPM 5 where the destination address of the packet is determined. Also, linked to the LPM is a routing engine which determine the egress chip port (one of transmitters 9) to which the packet should be sent.

The electronic switch is 3 and this is where the packet is physically switched. It has output queued shared memory with appropriate buffering. Large packets may be segmented—that is divided into packets of the correct size (a cell) for transmission and small packets may be subject to packing into a cell. Typically, the system runs on a FIFO packet basis.

If the packet is an IP packet, and if the egress port is an Ethernet port, the packet's MAC address must be modified to be the same address as that of the next hop router. This is achieved in the ARP Cache 6.

Before the packets are transmitted at transmitters 9, they are processed by the Packet Processor Egress circuits 8. The transmitter circuits 9 include the Ethernet MAC, the PCS, the transmitter driver for the optical modulator on the silicon photonics chip and the PMA (Physical Medium Attachment) (analogue mixed signal).

The transmitter circuits are connected to the optical chip by bonds, typically short wire bonds 13 but pads and vias may also be used. The CMOS chip has the usual I/O circuits and connections here shown as 7 and 12. The CMOS chip works in a host environment and the host interface is shown at 10 and the host PPE and PPI at 11.

Laid out in this exemplary manner it can be seen that the connections between parts of the circuit can be kept quite short. Exemplary connections are shown between items 2 and 5 only for ease of presentation. In this way, the inputs are on one side of the chip and the outputs on the opposite side of the chip. However, it would be possible to achieve at least some of the advantages of this invention by having input receiver circuits and output transmitter circuits on adjacent sides of the chip.

The arrangement leads to two main advantages. Firstly, since this arrangement aims to maximize the distance between the Tx and Rx circuitry, crosstalk between the two is greatly reduced, if not eliminated. This is particularly true when considering the chip structure in contrast to the conventional case, in which the Tx and Rx circuitry alternates along a single side of the CMOS chip. In such cases, since each Tx circuit is adjacent to an Rx circuit, there is the potential for a great deal of undesirable crosstalk. Since this crosstalk is reduced, the chips may have a smaller floorplan.

The second advantage afforded by the arrangement shown in FIG. 5 is that it leads to a far simpler design. Data flow through the CMOS chip is simply from left to right (bottom to top), with no need to go back on itself. An arrangement in which the Tx and Rx circuits are on opposite sides of the chips therefore means that designing the chips themselves is easier, leading to more easily customizable products.

Figure 6A:
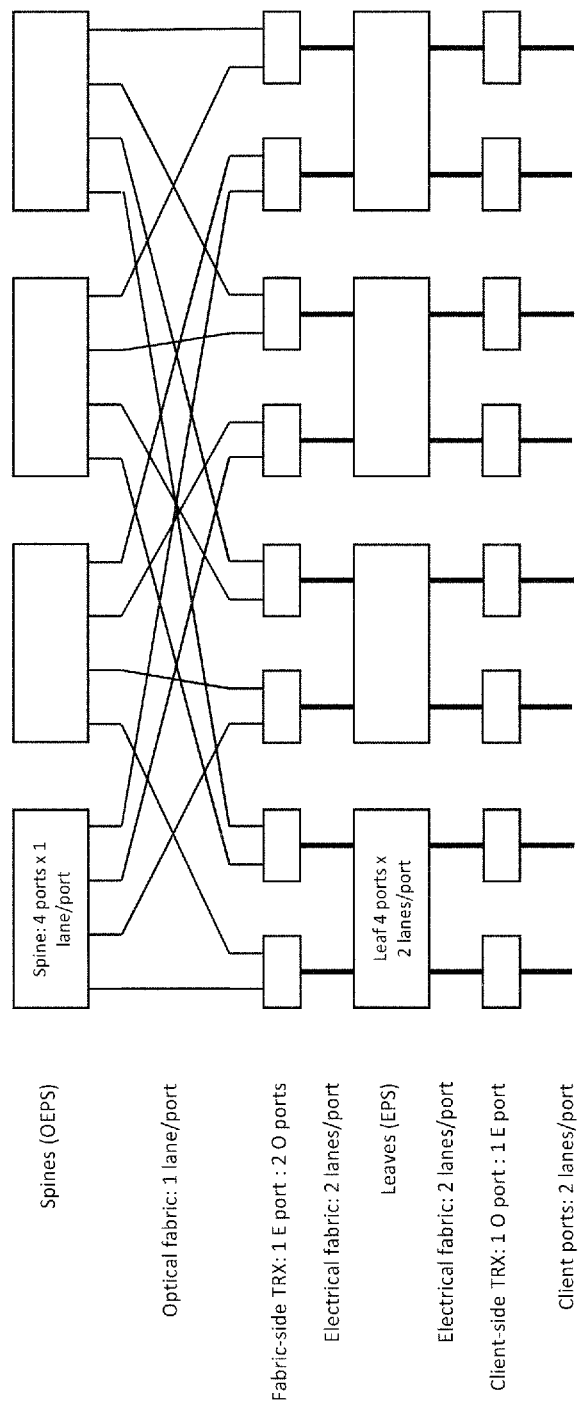
FIGS. 6A to 6C show three examples of layouts of an optoelectronic switch according to the present invention, in order to demonstrate the importance of conservation of bisection bandwidth.
Figure 6B:
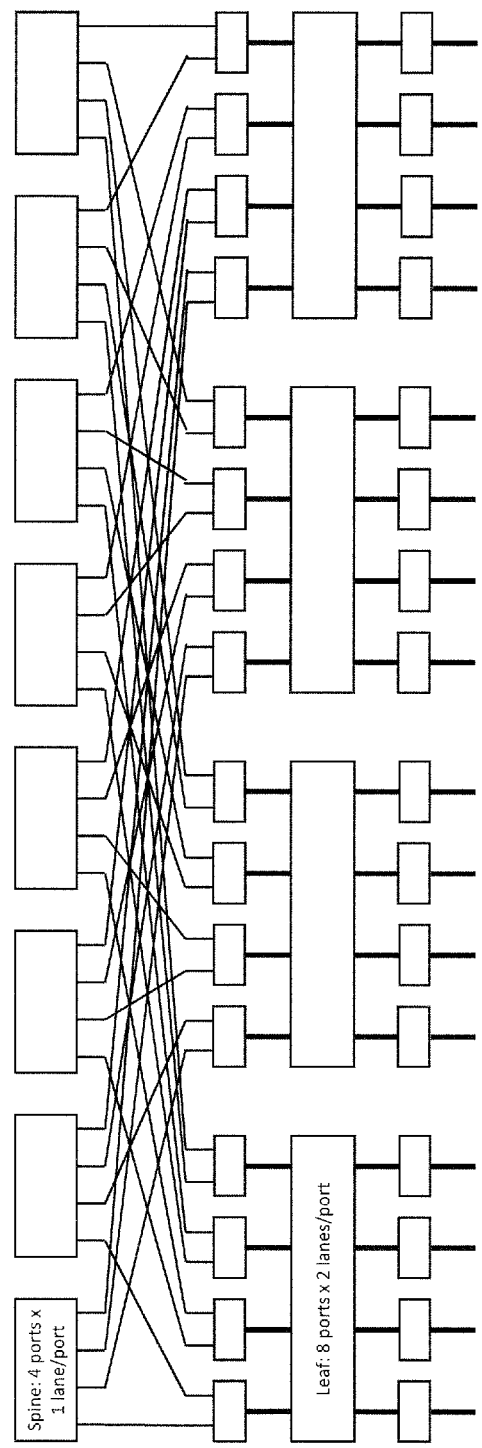
Figure 6C:
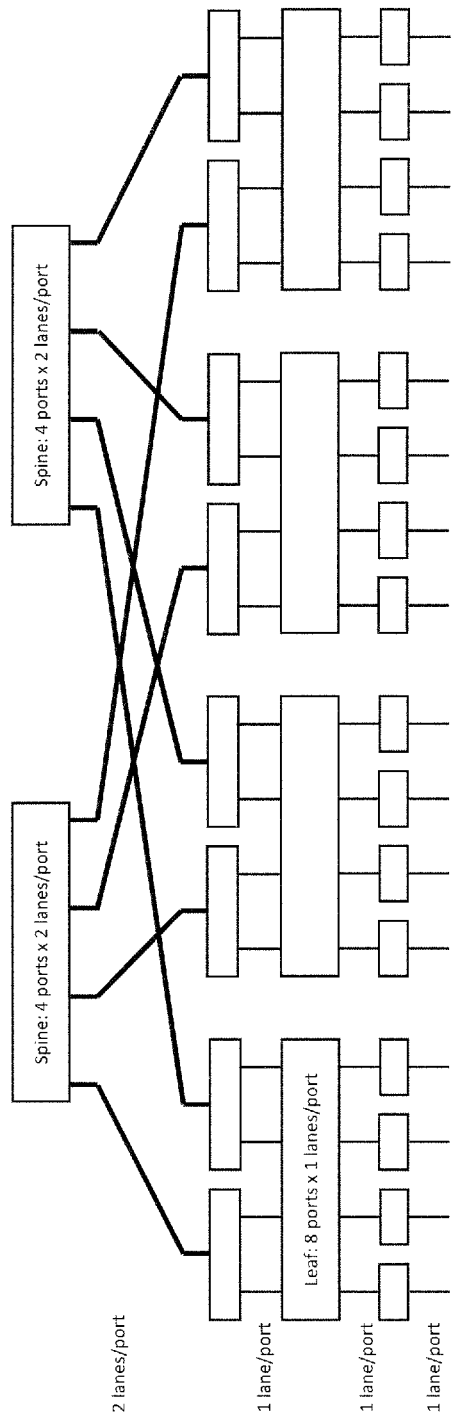

FIGS. 6A to 6C demonstrate the importance of conservation of bisection bandwidth. FIG. 6A shows an example layout of an optoelectronic switch having spine switches with a first speed, and with the same number of spines as leaves. In FIG. 6B the spine switches are half as fast as in FIG. 6A, and there are more spine switches than leaves. In FIG. 6C, the spine switches are twice as fast as in FIG. 6A. The precise specifications of the switches shown in these drawings is as follows:

FIG. 6A has the same number of spines as leaves:
- 8 client-side transceivers each having one optical port with two lanes, and one electrical port with two lanes.
- 4 leaf switches, each having two client-side electrical ports with two lanes, and two fabric-side electrical ports with two lanes (i.e. eight lanes per leaf)
- 8 fabric-side transceivers, each having one leaf-facing electrical port with two lanes, and two fabric-facing optical ports with one lane.
- 4 spine switches, each having four fabric-facing optical ports with one lane.

FIG. 6B has more spines than leaves:
- 16 client-side transceivers, each having one optical port with two lanes, and one electrical port with two lanes.
- 4 leaf switches, each having four client-side electrical ports with two lanes, and four fabric-side electrical ports with two lanes (i.e. sixteen lanes per leaf)
- 16 fabric-side transceivers, each having one leaf-facing electrical port with two lanes, and two fabric-facing optical ports with one lane. fabric-side
- 8 spine switches, each having four fabric-facing optical ports with one lane.

In FIG. 6C, the spines are twice the speed.
- 16 client-side transceivers, each having one optical port with one lane, and one electrical port with one lane.
- 4 leaf switches, each having four client-side electrical ports with one lane, and four fabric-side electrical ports with one lane (i.e. eight lanes per leaf)
- 8 fabric-side transceivers, each having two leaf-facing electrical ports with one lane, and one fabric-facing optical port with two lanes.
- 2 spine switches, each having four fabric-facing optical ports with two lanes.

It should be noted that, as well as changing the number of lanes provided by a given port, the speed of the ports may be changed by varying the signalling rate of each lane.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An optoelectronic switch for switching data from a source external client device to a destination external client device, the optoelectronic switch including:
   - an array of client-side transceivers, each having an array of client-facing optical ports to connect to an external client device, and an array of leaf-facing electrical ports;
   - an array of leaf switches, each including an array of client-side electrical ports and an array of fabric-side electrical ports;
   - a first electrical interconnecting region providing electrical connections between the leaf-facing electrical ports of the client-side transceivers and the client-side electrical ports of the leaf switches;
   - an array of fabric-side transceivers, each having an array of leaf-facing electrical ports, and an array of fabric-facing optical ports;
   - a second electrical interconnecting region providing electrical connections between the fabric-side electrical ports of the leaf switches and the leaf-facing electrical ports of the fabric-side transceivers;
   - an array of spine switches, each including an array of fabric-facing optical ports; and
   - an optical fabric providing connections between the fabric-facing optical ports of the fabric-side transceivers and the fabric-facing optical ports of the spine switches,
   - wherein, for a given spine switch, there is a connection provided between each of the leaf switches, via a fabric-side transceiver.

2. An optoelectronic switch according to claim 1, wherein any or all of the connections present in the first electrical interconnecting region, the second electrical interconnecting region and/or the optical fabric are bidirectional connections.

3. An optoelectronic switch according to claim 1, wherein each leaf switch is connected to a plurality of fabric-side transceivers.

4. An optoelectronic switch according to claim 1, wherein, for a given leaf switch, a total number of fabric-facing optical ports on a set of fabric-side transceivers to which that leaf switch is connected is equal to or greater than a number of spine switches in the array of spine switches.

5. An optoelectronic switch according to claim 1, wherein a total number of fabric-facing optical ports on the array of spine switches is greater than or equal to a number of leaf switches in the array of leaf switches.

6. An optoelectronic switch according to claim 1, wherein, for a given spine switch, there is a one-to-one relationship between the fabric-facing optical ports on that spine switch and the respective leaf switches to which they are connected.

7. An optoelectronic switch according to claim 1, wherein, for a given leaf switch, there is a one-to-one relationship between the fabric-side electrical ports of that leaf switch and the leaf-facing electrical ports on a set of fabric-side transceivers to which that leaf switch is connected.

8. An optoelectronic switch according to claim 1, wherein each leaf switch is connected to a plurality of client-side transceivers.

9. An optoelectronic switch according to claim 1, wherein a given leaf switch includes an electronic packet switch, such as a crossbar switch or a shared memory switch.

10. An optoelectronic switch according to claim 1, wherein a given leaf switch includes a first switching part having inputs and outputs corresponding respectively to the client-side electrical ports and the fabric-side electrical ports of that leaf switch.

11. An optoelectronic switch according to claim 10, wherein the leaf switch includes a first routing module arranged to determine, based on destination information contained in a first electrical switching signal received at a fabric-side electrical port of the leaf switch, to which output the first electrical switching signal should be directed, and wherein the first switching part is then arranged to direct the first electrical switching signal from an input to that output of the first switching part.

12. An optoelectronic switch according to claim 1, wherein each leaf switch is configured to select to which fabric-facing port of a fabric-side transceiver a given optical signal should be directed, the given optical signal corresponding to an electrical signal passing through that leaf switch.

13. An optoelectronic switch according to claim 12, wherein each leaf switch is configured to add a tag to the electrical signal in order to inform the fabric-side transceiver of the fabric-facing optical port which has been selected.

14. An optoelectronic switch according to claim 1, wherein each of the spine switches includes:
a receiving side having a respective optical-to-electrical converter associated with each of the fabric-facing optical ports of the spine switch and arranged to convert an optical signal arriving at that port into an electrical signal;
a switching part having inputs, each input arranged to receive an electrical signal from an optical-to-electrical converter on the receiving side of the spine switch, and outputs; and
a transmission side having a respective electrical-to-optical converter associated with each of the fabric-facing optical ports of the spine switch, and arranged to convert an electrical signal arriving at that port from the switching part into an optical signal.

15. An optoelectronic switch according to claim 14, wherein the spine switch includes an ingress packet processor, arranged to determine, based on destination information contained in the electrical signals, to which output the electrical signal should be directed, and wherein the switching part is then arranged to direct the electrical signal from an input to that output of the switching part.

16. An optoelectronic switch for switching data from a source external client device to a destination external client device, the optoelectronic switch including:
an array of client-side transceivers, each having an array of client-facing optical ports to connect to an external client device, and an array of leaf-facing electrical ports;
an array of leaf switches, each including an array of client-side electrical ports and an array of fabric-side electrical ports;
a first electrical interconnecting region providing electrical connections between the leaf-facing electrical ports of the client-side transceivers and the client-side electrical ports of the leaf switches;
an array of fabric-side transceivers, each having an array of leaf-facing electrical ports, and an array of fabric-facing optical ports;
a second electrical interconnecting region providing electrical connections between the fabric-side electrical ports of the leaf switches and the leaf-facing electrical ports of the fabric-side transceivers;
an array of spine switches, each including an array of fabric-facing optical ports; and
an optical fabric providing connections between the fabric-facing optical ports of the fabric-side transceivers and the fabric-facing optical ports of the spine switches,
wherein the fabric-side transceivers are configured to select to which fabric-facing optical port of the fabric-side transceiver a given optical signal should be directed.

17. An integrated circuit for use in a spine switch having an array of fabric-facing optical ports, the integrated circuit having:
a first portion having an array of electrical inputs, each electrical input configured to receive an electrical signal from optical-to-electrical converters which are associated with the fabric-facing optical ports of the spine switch;
a second portion having an array of electrical outputs, each electrical output configured to transmit an electrical signal to a respective electrical-to-optical converter associated with one of the fabric-facing optical ports of the spine switch;
a switching part;
an ingress packet processor; and
an egress packet processor,
wherein the first portion is located at a first side of the integrated circuit, and the second portion is located at a second side of the integrated circuit, the first side different from the second side, and
wherein the first side is opposite the second side.

18. A spine switch including the integrated circuit of claim 17 and the array of fabric-facing optical ports.

* * * * *